United States Patent
Usukura

(10) Patent No.: US 8,682,547 B2
(45) Date of Patent: Mar. 25, 2014

(54) GEAR RATIO CONTROL METHOD FOR CONTINUOUSLY VARIABLE TRANSMISSION OF A VEHICLE

(75) Inventor: Yasutaka Usukura, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 1326 days.

(21) Appl. No.: 12/284,430

(22) Filed: Sep. 22, 2008

(65) Prior Publication Data

US 2009/0088938 A1  Apr. 2, 2009

(30) Foreign Application Priority Data

Sep. 27, 2007 (JP) ................. 2007-251623

(51) Int. Cl.
- *G06F 7/00* (2006.01)
- *G06F 17/00* (2006.01)
- *G06F 19/00* (2011.01)

(52) U.S. Cl.
USPC ............................................. 701/55; 701/51

(58) Field of Classification Search
USPC ...................................... 701/51–56
See application file for complete search history.

(56) References Cited

U.S. PATENT DOCUMENTS

| 2004/0187676 A1* | 9/2004 | Ito et al. ..................... 92/5 R |
| 2006/0009327 A1* | 1/2006 | Ohta .......................... 477/175 |

FOREIGN PATENT DOCUMENTS

| JP | 6-249329 A |   | 9/1994 |
| JP | 7-248056 A |   | 9/1995 |
| JP | 07332462 A | * | 12/1995 |
| JP | 2005-263143 |   | 9/2005 |
| JP | 2006-200727 |   | 8/2006 |
| JP | 2006-200727 A |   | 8/2006 |

\* cited by examiner

*Primary Examiner* — Thomas Tarcza
*Assistant Examiner* — Imran Mustafa
(74) *Attorney, Agent, or Firm* — Carrier Blackman & Associates, P.C.; William D. Blackman; Joseph P. Carrier

(57) ABSTRACT

At an actual engine rotary speed corresponding to a partially engaged state of a starting clutch, a target gear ratio control of a continuously variable transmission is performed by determining a target gear ratio from a target engine rotary speed. At an actual engine rotary speed corresponding to an engaged state of the starting clutch, the gear ratio is controlled in a manner such that the actual engine rotary speed converges with a target engine rotary speed. Accordingly, when it is intended to start the vehicle with a comparatively large throttle opening, it is possible, at the partially engaged condition, to obviate a rise in the actual engine rotary speed with the gear ratio position sticking to a desired position, so that a predetermined driving force is attained when the starting clutch is engaged.

20 Claims, 7 Drawing Sheets

GEAR RATIO CONTROL METHOD FOR CONTINUOUSLY VARIABLE TRANSMISSION OF A VEHICLE

CROSS-REFERENCE TO RELATED APPLICATIONS

The present application claims priority under 35 USC §119 based on Japanese patent application No. 2007-251623, filed on Sep. 27, 2007. The entire subject matter of this priority document is incorporated by reference herein.

BACKGROUND OF THE INVENTION

1. Field of the Invention

The present invention relates to a gear ratio control method for a continuously variable transmission in a vehicle, in which a starting clutch is operable to automatically engage and disengage according to a rotary speed of an engine, and a continuously variable transmission unit is operable to continuous speed change according to the rotary speed of an input shaft; and in which, the starting clutch and the continuously variable transmission unit are connected in series between a crankshaft of the engine and an output shaft. More particularly, the present invention relates to a gear ratio control method for a continuously variable transmission in which a target engine rotary speed is computed based on a vehicle speed and a throttle opening, and the gear ratio is controlled based on such computed target engine rotary speed.

2. Description of the Background Art

There are several known power units which include an engine and a hydrostatic continuously variable transmission including a swash-plate-type hydraulic pump and a swash-plate-type hydraulic motor, and in which the hydraulic pump is driven to rotate by the engine, a swash plate angle in at least one of the hydraulic pump and the hydraulic motor is controlled to change an input rotary speed of the hydraulic pump, and an output is taken out as an output rotary speed of the hydraulic motor. An example of such known power unit is disclosed in the Japanese Patent Laid-open No. 2005-263143.

Further, another example of such known power unit is disclosed in the Japanese Patent Laid-open No. 2006-200727 (particularly FIGS. 1 and 9 thereof). The Japanese Patent Laid-open No. 2006-200727 discloses not only a power unit including a hydrostatic continuously variable transmission but also a power unit including a belt-type continuously variable transmission having a metallic belt wrapped around a drive pulley and a driven pulley.

In the power unit disclosed respectively in the Japanese Patent Laid-open No. 2005-263143 and the Japanese Patent Laid-open No. 2006-200727, since a starting clutch is disposed on the output shaft side, torque control can be carried out at a position which is the nearest to an axle, and smoothness of vehicle starting is secured. In addition, it is possible to achieve an appropriate creep, thereby facilitating the driving-around of the vehicle at the time of a vehicle starting on a slope, at the time of garaging a vehicle, and so on.

At the time of starting of a vehicle (motorcycle or four-wheel vehicle) equipped with the power unit, such as disclosed in the Japanese Patent Laid-open No. 2005-263143 and the Japanese Patent Laid-open No. 2006-200727, an operation of the throttle in an attempt to start the vehicle at a comparatively large throttle opening tends to increase an engine rotary speed until a target engine rotary speed according to the throttle opening (throttle position) is reached.

Accordingly, the engine rotary speed increases when the gear ratio position is maintained along (sticking to) a LOW position among a plurality of gear ratio positions. Then, the starting clutch comes into a partially engaged state at an engine rotary speed of, for example, 1400 rpm (clutch-OFF rotary speed), and the starting clutch comes to be engaged (connected) at an engine rotary speed of, for example, 1800 rpm (clutch-ON rotary speed).

However, there is the problem that when the starting clutch is engaged, the gear ratio position is at the LOW position, and due to the high driving force, the shock (due to engine/vehicle vibration) at the time of the connection (engagement) of the starting clutch is so great that the vehicle starting feeling is bad, e.g., shocking, bumping of the engine.

The present invention has been made to overcome such drawbacks. Accordingly, it is one of the objects of the present invention to provide a gear ratio control method, for a continuously variable transmission, by which it is possible to reduce the shock at the time of connection of a starting clutch even if the throttle opening is comparatively large at the time of starting, and it is therefore, possible to obtain a smooth vehicle starting feeling.

SUMMARY OF THE INVENTION

In order to achieve the above objects, the present invention provides a gear ratio control method for a continuously variable transmission in a vehicle. According to the gear ratio control method of the present invention, a starting clutch is operable to automatically engage and disengage according to the rotary speed of an engine, and the continuously variable transmission operable to continuous speed change according to the rotary speed of an input shaft. The starting clutch and the continuously variable transmission are connected in series with each other, and are disposed between a crankshaft of the engine and an output shaft. A target engine rotary speed is computed from a vehicle speed and a throttle opening.

The gear ratio in the continuously variable transmission is controlled based on the target engine rotary speed. At an engine rotary speed corresponding to a partially engaged state of the starting clutch, a target gear ratio control of the continuously variable transmission is performed by determining a target gear ratio from the target engine rotary speed. At an engine rotary speed corresponding to an engaged state of the starting clutch, the gear ratio is controlled such that the engine rotary speed converges with the target engine rotary speed.

Thus, according to the present invention, at the engine rotary speed corresponding to the partially engaged state of the starting clutch, the target gear ratio control of the continuously variable transmission is controlled by determining the target gear ratio from the target engine rotary speed, whereas at an engine rotary speed corresponding to the engaged state of the starting clutch, the gear ratio is controlled such that the engine rotary speed converges with the target engine rotary speed.

Therefore, for example, when the throttle is operated at the time of vehicle starting in an attempt to start the vehicle with a comparatively large throttle opening and it is intended to obtain the target engine rotary speed according to the throttle opening, it is possible in the partially engaged state to set the gear ratio at a target gear ratio other than that corresponding to the LOW position.

As a result, an increase in the engine rotary speed with the gear ratio position kept along (sticking to) the LOW position as disclosed in the prior art can be obviated. Therefore, at the time when the starting clutch is engaged, a predetermined driving force according to the target gear ratio can be attained, and the shock (vehicle vibration) at the time of the connection (engagement) of the starting clutch can be reduced. Consequently, a good vehicle starting feeling is obtained.

For example, the gear ratio in the target gear ratio control in the partially engaged state may be set at a middle position between the LOW position and the HIGH position, whereby the shock at the time of connection (engagement) of the starting clutch can be reduced, and the vehicle starting feeling can be maintained in a good condition. The gear ratio may not be set at the middle position, but may be set at a non-middle position between the LOW position and the HIGH position, whereby the shock at the time of the connection (engagement) can be reduced to a certain, desired extent.

In this case, the target gear ratio in the target gear ratio control may be determined by multiplying a gear ratio for obtaining the target engine rotary speed obtained based on the vehicle speed and a gear ratio map by a constant of not greater than 1.

Incidentally, where the continuously variable transmission is a swash-plate-type hydrostatic continuously variable transmission, the target gear ratio control is performed by moving the swash plate angle in the continuously variable transmission unit to a desired target angle position.

Effects of the Invention

According to the present invention, the gear ratio is controlled at an engine rotary speed corresponding to the partially engaged state of the starting clutch. Therefore, for example, in the case where it is attempted to start the vehicle with a comparatively large throttle opening and it is intended to obtain a target engine rotary speed according to the throttle opening, it is possible in the partially engaged state to determine the gear ratio at a value corresponding to other position than the LOW position, so that a rise in the engine rotary speed with the gear ratio position kept along (sticking to) the LOW position, as in the prior art, can be obviated. Therefore, at the time when the clutch is engaged, a predetermined driving force according to the target gear ratio can be attained, so that the shock at the time of connection (engagement) of the clutch can be reduced, and a good vehicle starting feeling can be obtained.

BRIEF DESCRIPTION OF THE DRAWINGS

FIG. 2 is a partial longitudinal sectional view of a power unit including the hydrostatic continuously variable transmission unit adapted to be mounted on a motorcycle or the like.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Now, with reference to the accompanying drawings, a gear ratio control system for carrying out the gear ratio control method for a continuously variable transmission according to the present invention is described below.

Figure 1:
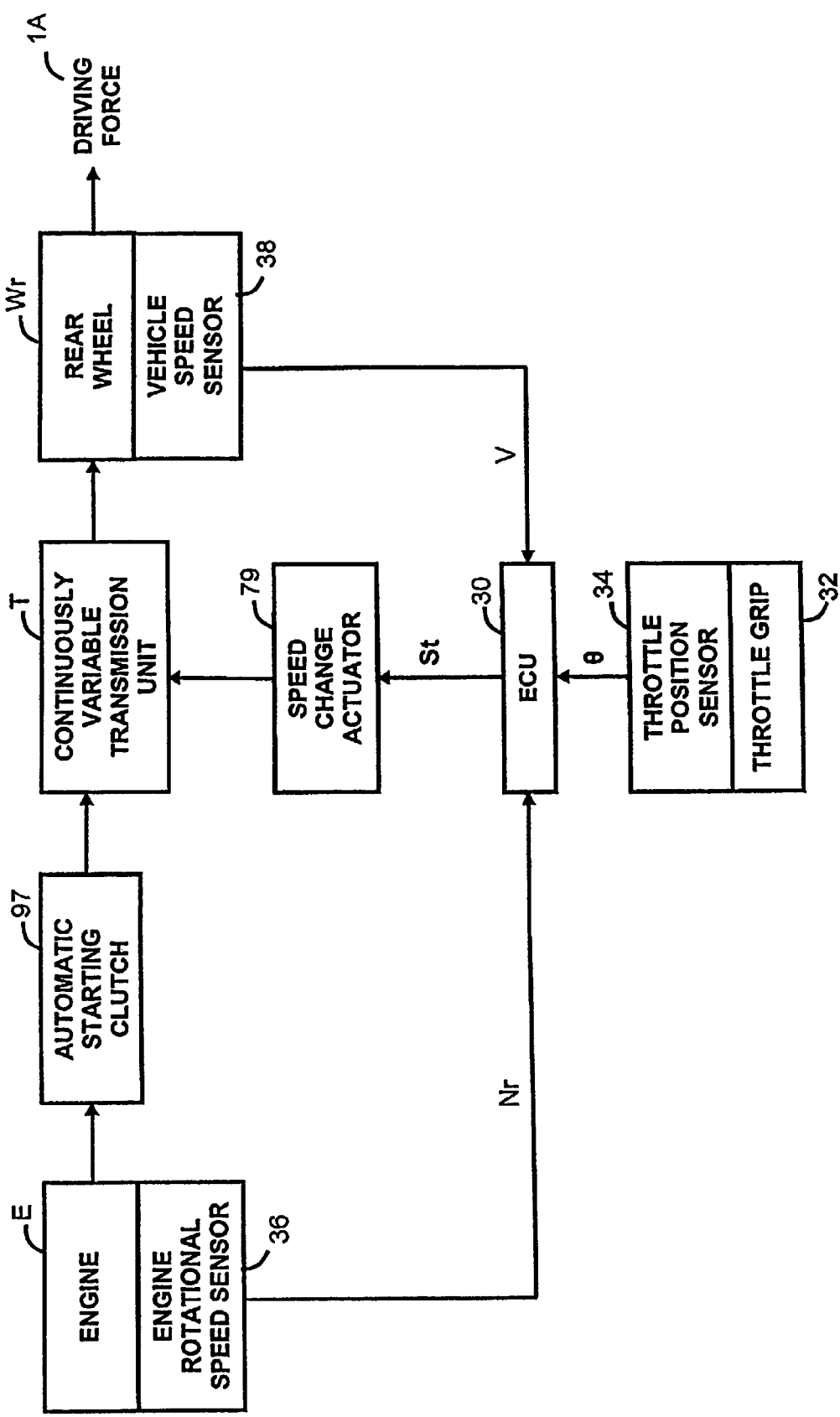
FIG. 1 is a generalized block diagram of a gear ratio control system according to an embodiment of the present invention, for controlling the gear ratio in a hydrostatic continuously variable transmission.
Figure 2:
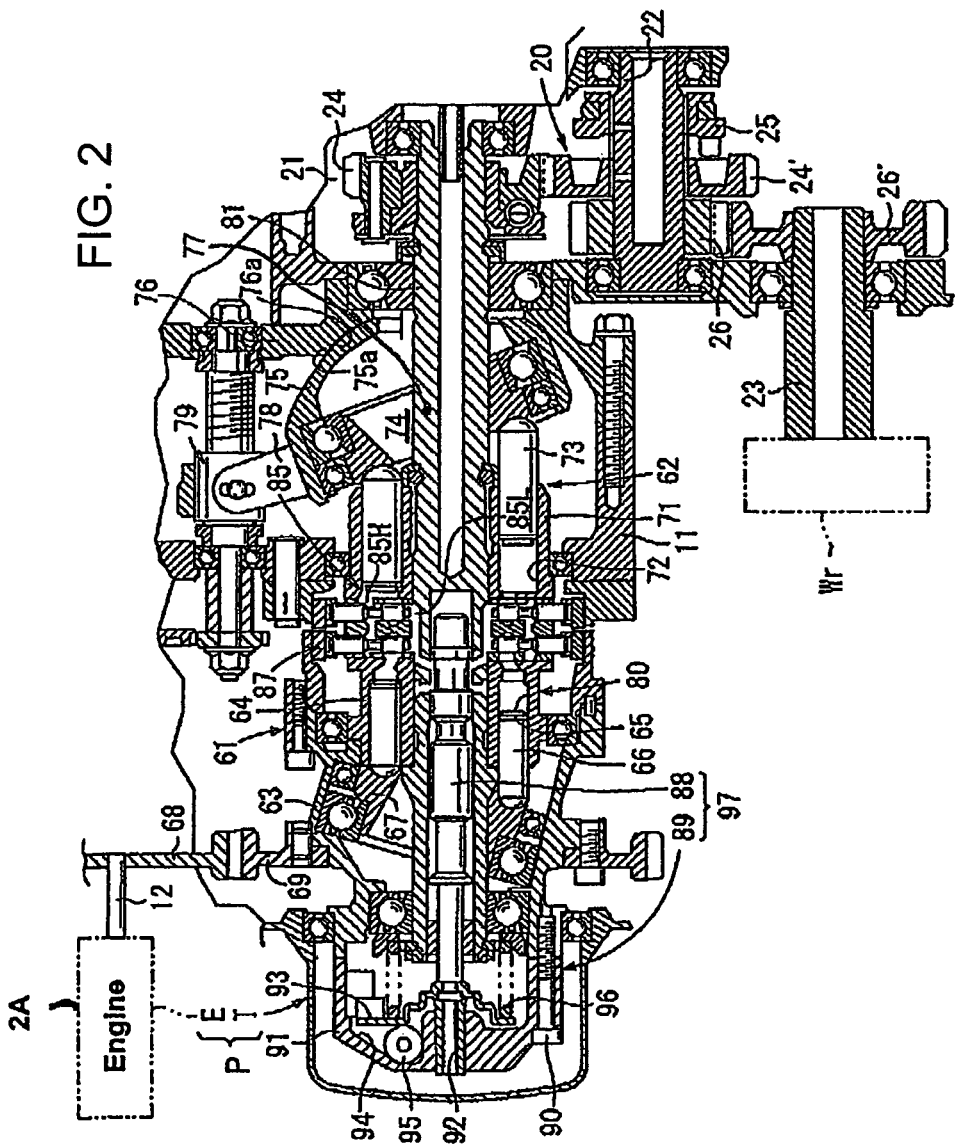

FIG. 2 is a partial longitudinal sectional view of a power unit P including a hydrostatic continuously variable transmission mountable on a vehicle such as a motorcycle. FIG. 1 is a generalized block diagram of the gear ratio control system 10 according to an illustrative embodiment for controlling the gear ratio in the hydrostatic continuously variable transmission (hereinafter referred to as the continuously variable transmission) shown in FIG. 2.

FIG. 2 shows the power unit P similar to as disclosed in Japanese Patent Laid-open No. 2006-200727.

First, the power unit P is described. As shown in FIG. 2, the power unit P includes an engine E, and a continuously variable transmission unit T for transmitting the power of the engine E to a rear wheel Wr of the vehicle.

The continuously variable transmission unit T includes a fixed displacement swash-plate-type hydraulic pump 61 (also refereed as a hydraulic pump 61), a variable displacement swash-plate-type hydraulic motor 62 (also refereed as a hydraulic motor 62), and a hydraulic closed circuit 85 for providing connection between the hydraulic pump 61 and the hydraulic motor 62.

The hydraulic pump 61 includes an input tubular shaft (input shaft) 63 rotatably supported on a transmission case 11; a pump cylinder 64 relatively rotatably supported by the input tubular shaft 63; a plurality of pump plungers 66, 66 . . . slidably fitted respectively in a plurality of pump cylinder bores 65, 65 . . . formed in the pump cylinder 64 while being arranged in an annular pattern so as to surround the rotational axis of the pump cylinder 64; and a pump swash plate 67 relatively rotatably held in the input tubular shaft 63 with its front surface abutting on the outer ends of the pump plungers 66, 66 . . . .

The input tubular shaft 63 includes an input gear 69 meshed with a drive gear 68 fixed to a crankshaft 12 of the engine E. The input gear 69 is provided at an outer periphery of the input tubular shaft 63.

When the input tubular shaft 63 is rotated by the power of the engine E, the pump swash plate 67 is operable to cause each of the pump plungers 66, 66 . . . to perform reciprocating motion so as to repeat suction and discharge strokes.

On the other hand, the hydraulic motor 62 includes a motor cylinder 71 (rotatably supported on the transmission case 11) disposed coaxially with the pump cylinder 64 and on the right side of the pump cylinder 64; a plurality of motor plungers 73, 73 . . . slidably fitted respectively in a plurality of motor cylinder bores 72, 72 . . . formed in the motor cylinder 71 while being arranged in an annular pattern so as to surround the rotational axis of the motor cylinder 71; a motor swash plate 74 having its front surface abutting on the outer ends of the motor plungers 73, 73 . . . ; a motor swash plate holder 75 for rotatably supporting the motor swash plate 74; and a motor swash plate anchor 76 for supporting a back surface of the motor swash plate holder 75. The motor swash plate anchor 76 is fixed to the transmission case 11.

Abutting opposed surfaces 75a and 76a of the motor swash plate holder 75 and the motor swash plate anchor 76 are each includes a hemispherical surface having a center on a trunnion axis 77 orthogonal to the axis of the motor cylinder 71, so that the motor swash plate holder 75 can be disposed inclined about the trunnion axis 77. A gear shift lever 78 protrudes from the outer peripheral surface of the motor swash plate holder 75. An actuator (speed change actuator) 79 for gear ratio variable control for inclining the motor swash plate 74 through the motor swash plate holder 75 is connected to the gear shift lever 78.

When the motor plungers 73, 73 . . . are reciprocated through the inclined state of the motor swash plate 74 so as to repeat expansion and contraction strokes, the motor cylinder 71 can be rotated through the motor swash plate 74. In addition, when the inclination angle position of the motor swash plate 74 is varied, the stroke of each of the motor plungers 73, 73 . . . is varied, whereby the displacement of the hydraulic motor 62 can be varied.

The pump cylinder 64 and the motor cylinder 71 are integrally coupled to each other to form a cylinder block 80. An output shaft 81 penetrating the cylinder block 80 is splinely connected to a central portion of the cylinder block 80.

An annular low-pressure oil passage 85L surrounding the output shaft 81, and an annular high-pressure oil passage 85H surrounding the low-pressure oil passage 85L are formed in the cylinder block 80 between the pump cylinder 64 and the motor cylinder 71. Further, the cylinder block 80 is provided with a distributing valve mechanism 87. The distributing valve mechanism 87 is operable to establish communication of the low-pressure and high-pressure oil passages 85L and 85H with inner end parts of the pump cylinder bores 65, 65 . . . and the motor cylinder bores 72, 72 . . . alternately and switchingly, according to the rotational position of the cylinder block 80. The low-pressure and high-pressure oil passages 85L and 85H constitute the above-mentioned hydraulic closed circuit 85.

Transfer of oil pressures is effected through the low-pressure oil passage 85L, the high-pressure oil passage 85H and the distributing valve mechanism 87 between the hydraulic pump 61 and the hydraulic motor 62, whereby the power of the engine E is transferred from the hydraulic pump 61 to the hydraulic motor 62 through the oil pressure. Besides, speed change can be effected through a process in which the speed change actuator 79 is operated to control inclination of the motor swash plate 74, thereby to control the displacement of the hydraulic pump 61.

A spool type clutch valve 88 is disposed in the center of the output shaft 81. The spool type clutch valve 88 is operable to slide to both sides in the axial direction thereof. The clutch valve 88 is configured such that, when located in a left-hand position, it establishes a short-circuit between the low-pressure oil passage 85L and the high-pressure oil passage 85H, and, when located in a right-hand position, it cancels the short-circuit between the low-pressure oil passage 85L and the high-pressure oil passage 85H.

A centrifugal mechanism 89 is connected to an outer end portion, protruding to the outside of the output shaft 81, of the clutch valve 88. The centrifugal mechanism 89 includes a rotating housing 91 secured to the input tubular shaft 63 by bolts 90 and rotated together with the input tubular shaft 63, and a working plate 93 slidably supported in a guide hole 92 coaxial with the output shaft 81, and an outer end portion of the clutch valve 88 connected to the working plate 93. A portion of the rotating housing 91, opposed to the working plate 93, is provided with a plurality of wedge surfaces 94 (one of them is shown in FIG. 2) inclined so as to gradually approach the working plate 93 as it move radially outwardly, and a roller-shaped centrifugal weight 95 inserted between the wedge surface 94 and the working plate 93.

In addition, a compression spring (return spring) 96 for pressing the working plate 93 towards the side of the wedge surfaces 94 with a predetermined set load is disposed in the rotating housing 91. The centrifugal mechanism 89 and the clutch valve 88 form a starting clutch (automatic starting clutch) 97.

During idling of the engine E, the rotary speed of the input tubular shaft 63 and the rotating housing 91 is low, so that the clutch valve 88 is held in the left-hand position, or clutch-OFF position, by the set load of the compression spring 96 through the working plate 93, whereby the low-pressure oil passage 85L and the high-pressure oil passage 85H are short-circuited to each other, so that the transfer of the oil pressure from the hydraulic pump 61 to the hydraulic motor 62 is not performed.

When the rotary speed of the engine E is progressively increased, and the input tubular shaft 63 and the rotating housing 91 are made to reach or exceed a predetermined rotary speed, the centrifugal weight 95 presses the working plate 93 rightwards against the set load of the compression spring 96 while beginning to climb the wedge surface 94 of the rotating housing 91 under an increasing centrifugal force. Therefore, the clutch valve 88 is also gradually moved rightwards by the working plate 93, whereby the short-circuit between the low-pressure oil passage 85L and the high-pressure oil passage 85H is gradually canceled.

Specifically, by way of a partially engaged state, the clutch valve 88 eventually reaches a clutch-ON position on the right side, whereon the short-circuit between the oil passages 85L and 85H is completely canceled. In other words, the starting clutch 97 is engaged (connected) in this instance. In this manner, power transmission between the hydraulic pump 61 and the hydraulic motor 62 by the oil pressure is started smoothly.

A mode changeover mechanism 20 is connected to the output shaft 81. A reduction chamber 21 is formed on one side of a rear inside portion of the transmission case 11. The mode changeover mechanism 20 is disposed in the reduction chamber 21.

The mode changeover mechanism 20 includes an intermediate shaft 22, a drive shaft 23, a primary drive gear 24, a primary driven gear 24', a dog clutch member 25, a secondary drive gear 26, and a secondary driven gear 26'.

The intermediate shaft 22 is rotatably supported in the transmission case 11 parallel to the output shaft 81. The drive shaft 23 also rotatably supported on the transmission case 11 parallel to the intermediate shaft 22. The primary drive gear 24 is splinely connected to an end portion of the output shaft 14, and protrudes into the reduction chamber 21. The primary driven gear 24' is rotatably supported on the intermediate shaft 22 and meshed with the primary drive gear 24.

The dog clutch member 25 (shown in a neutral mode position N in FIG. 2) comes into a drive mode position D when moved leftwards). The dog clutch member 25 is slidably splinely fitted over the intermediate shaft 22, adjacently to one side of the primary driven gear 24'. The secondary drive gear 26 is connected to the intermediate shaft 22, adjacently to the other side of the primary driven gear 24'. The secondary driven gear 26' is splinely connected to the drive shaft 23, and is driven by the secondary drive gear 26 in a speed-reducing manner. The rear wheel Wr is attached to an outer end portion, protruding to the outside of the transmission case 11, of the drive shaft 23 so as to be rotated together with the drive shaft 23.

The power unit P including the continuously variable transmission unit T is configured and operated as described above.

Figure 3:
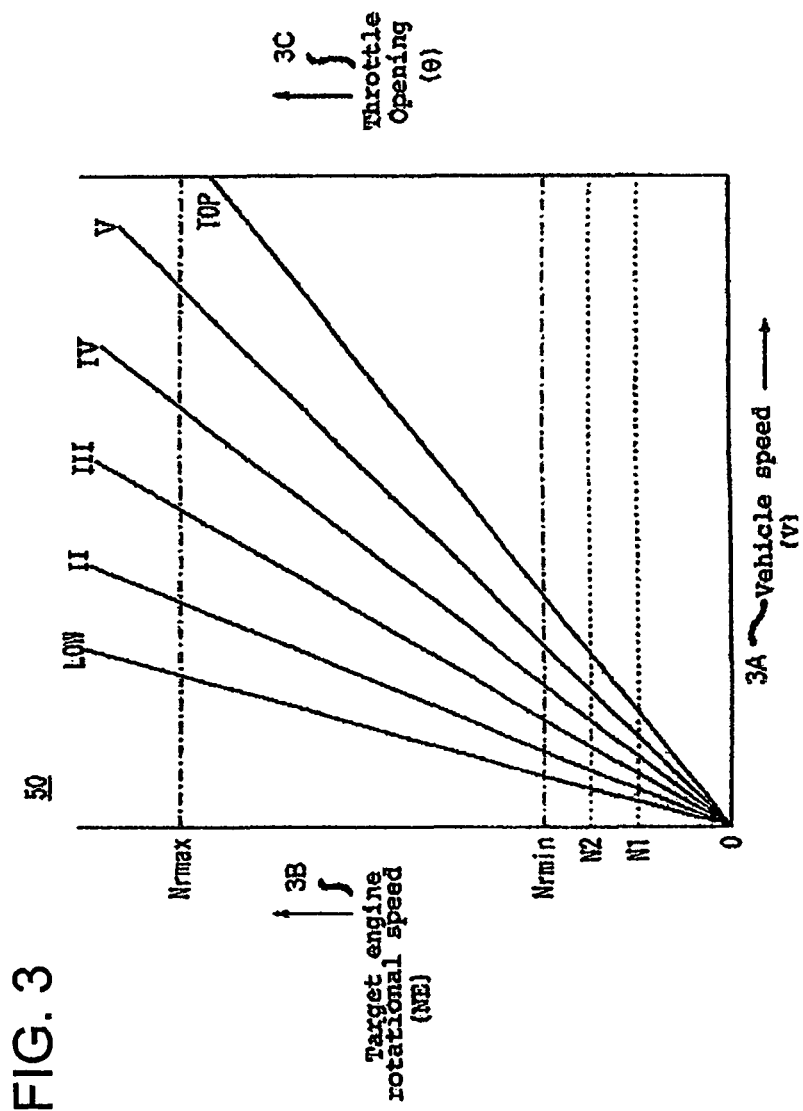
FIG. 3 is a graph illustrating a gear ratio map.

FIG. 3 illustrates a gear ratio map 50. A target engine rotary speed NE is computed from a vehicle speed V and a throttle opening θ by referring to the gear ratio map 50. The gear ratio of the continuously variable transmission unit T is controlled based on the target engine rotary speed NE.

In practice, the continuously variable transmission unit T is so configured that the gear ratio can be shifted (changed) steplessly (continuously) and automatically, by continuously controlling the inclination angle (swash plate angle) position of the motor swash plate 74 by the speed change actuator 79.

Here, for convenience of understanding and explanation, it is assumed that, as shown in FIG. 3, representative gear positions (also called shift positions) I (LOW), II, III, IV, V, VI (TOP) can be shifted stepwise and automatically, from the gear position I (LOW) corresponding to a high gear ratio to the gear position VI (TOP) corresponding to a low gear ratio, by controlling, stepwise the inclination angle of the motor swash plate 74 by the speed change actuator 79.

In FIG. 3, a clutch-OFF rotary speed N1 (N1=1400 rpm) is an engine rotary speed where the clutch is disengaged, and a clutch-ON rotary speed N2 (N2=1800 rpm) is an engine rotary speed where the starting clutch 97 is engaged. In the range from the clutch-OFF rotary speed N1 to the clutch-ON rotary speed N2, the clutch is in the partially engaged state. Incidentally, gear position auto-upshift upper limit speed Nrmax and a gear position auto-downshift lower limit speed Nrmin are set.

Figure 4:
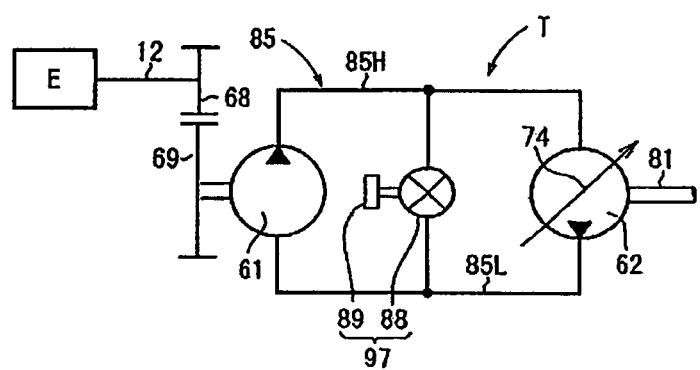
FIG. 4 is a hydraulic circuit diagram of the hydraulic continuously variable transmission of the present invention.

FIG. 4 is a hydraulic circuit diagram of the continuously variable transmission unit T. As shown in FIG. 4, the rotation of the engine E is transmitted to the input gear (input shaft) 69 through the crankshaft 12 and the drive gear 68. With the input gear 69 rotated, the hydraulic pump 61 is driven. The hydraulic pump 61 drives the hydraulic motor 62, which has the motor swash plate 74, through the hydraulic closed circuit 85 having the high-pressure oil passage 85H and the low-pressure oil passage 85L. The output shaft 81 is rotated synchronously with the rotation of the hydraulic motor 62.

The starting clutch 97 including the clutch valve 88 and the centrifugal mechanism 89 is inserted in the hydraulic closed circuit 85. While the engine rotary speed NE is not more than the clutch-OFF rotary speed N1, the centrifugal mechanism 89 is not operated, so that the clutch valve 88 is in an opened state. Therefore, the hydraulic closed circuit 85 is opened, and the driving force of the hydraulic pump 61 is not transmitted to the hydraulic motor 62, so that the output shaft 81 is not rotated.

As shown in FIG. 1, the gear ratio control system 10 has an ECU (Electronic Control Unit) 30 functioning as a control unit. The ECU 30 includes a CPU, a ROM, a RAM, an A/D converter, a D/A converter, a time counting means such as a counter-timer, and other interfaces. An operation as a function realizing means (functional unit) for realizing various kinds of functions is attained through a process in which the CPU executes programs stored in the ROM, based on various kinds of inputs.

When the vehicle is assumed to be a motorcycle, the throttle opening θ is input to the ECU 30 from a throttle position sensor 34 for detecting the opening of the throttle valve according to an operation on a throttle grip 32. In addition, the actual engine rotary speed Nr is input to the ECU 30 from an engine rotary speed sensor 36 for detecting the rotation of the engine E. Further, the vehicle speed V is input to the ECU 30 from a vehicle speed sensor 38 accompanying the rotation of the rear wheel Wr.

The ECU 30 computes the target engine rotary speed NE for the engine E by referring to the gear ratio map 50 according to the detected vehicle speed V and the detected throttle opening θ, and controls the gear ratio of the continuously variable transmission unit T through the speed change actuator 79 by a control signal St so that the target engine rotary speed NE is attained.

Figure 5:
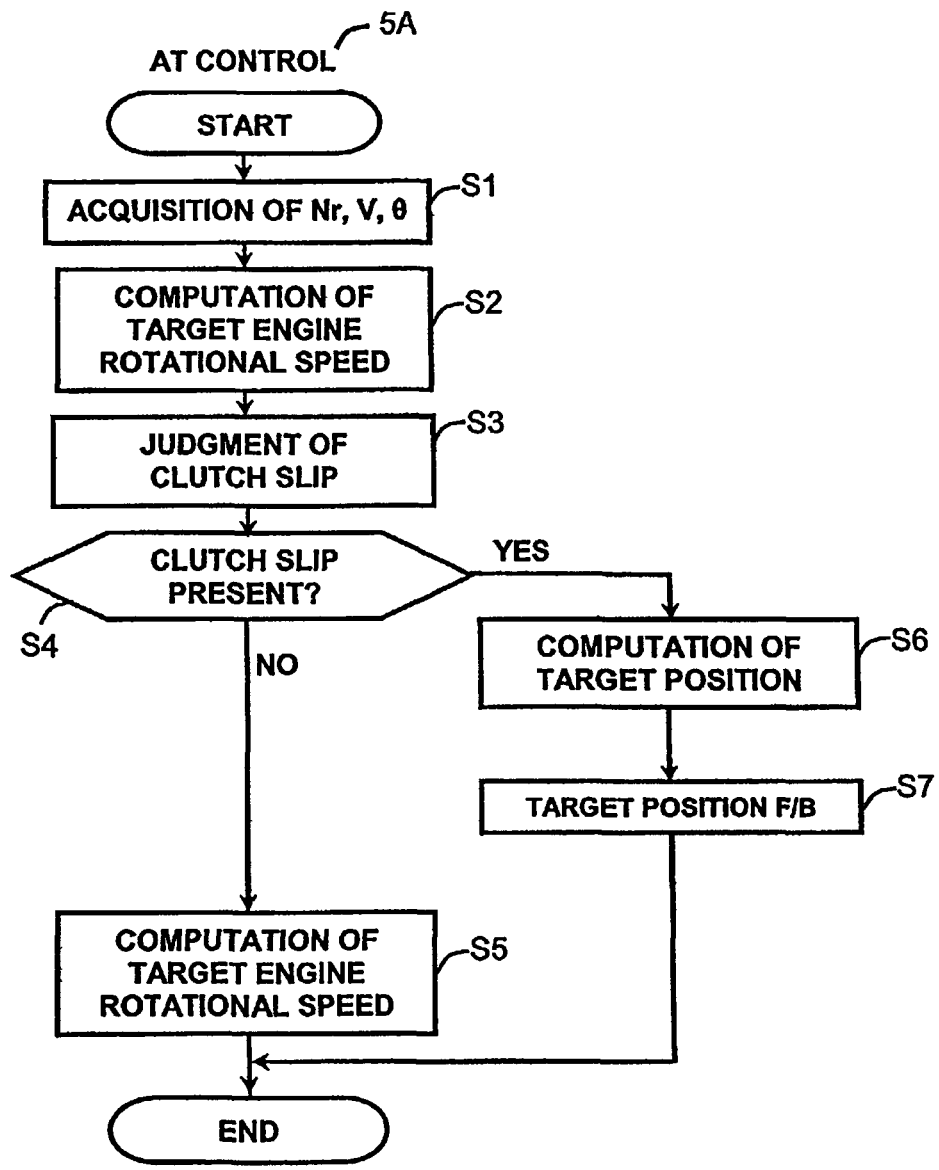
FIG. 5 is a flow chart of a gear ratio control.
Figure 6:
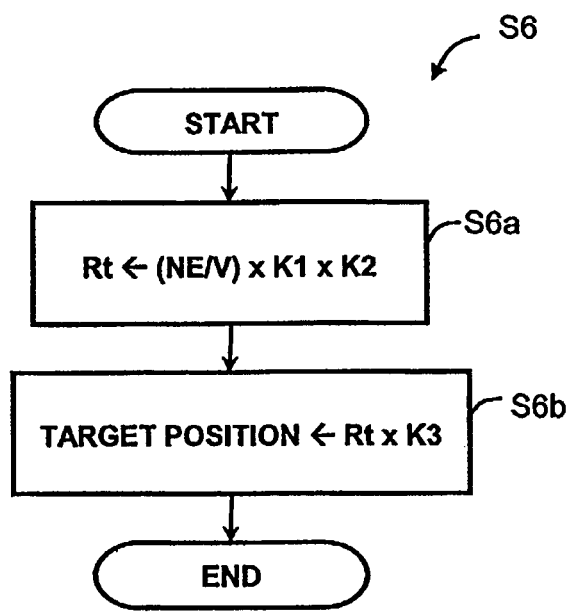
FIG. 6 is a flow chart showing an example of computing process for a target angle position in the gear ratio control.

Essential-part operations of the gear ratio control system 10, which basically is configured and operates as above-mentioned, is described referring to flow charts shown in FIGS. 5 and 6.

As shown in FIG. 5, in step S1, the ECU 30 acquires the actual engine rotary speed Nr, the throttle opening θ, and the vehicle speed V. In step S2, the ECU 30 refers to the gear ratio map 50 on the basis of the throttle opening θ and the vehicle speed V thus acquired, to compute the target engine rotary speed NE.

Next, in step S3, it is judged whether or not a slip, so-called clutch slip, is present in the starting clutch 97. The clutch slip can be simply judged by judging whether or not the actual engine rotary speed Nr is between the clutch-OFF rotary speed N1 and the clutch-ON rotary speed N2.

More accurately, however, the clutch slip can be judged, for example, by use of the following expression (1) which indicates whether the value $\{(Nr/R) \times K1\}$, obtained by a process wherein the value $(Nr/R)$ obtained by dividing the actual engine rotary speed Nr by the current gear ratio R (which can be obtained through conversion from the control signal St input to the speed change actuator 79) is multiplied by a constant (represented by K1) preliminarily obtained based on the circumferential length of the rear wheel Wr by taking the gear ratio into account, is smaller than the vehicle speed V.

$$(Nr/R) \times K1 \leq V \tag{1}$$

When it is found in step S4 that the vehicle speed computed based on the actual engine rotary speed Nr and the gear ratio R is equal to the actual vehicle speed V (inclusive of a certain tolerance), it is judged that the clutch slip is absent. In this case, in step S5, an ordinary feedback (F/B) control is conducted, i.e., the gear ratio R is so controlled that the actual engine speed Nr will be equal to the target engine rotary speed NE.

On the other hand, when it is judged in step S4 that the clutch slip is present, i.e., that the clutch is in the partially engaged state, a target angle position computing process, as shown in detail in FIG. 6, is carried out in step S6. In this case, in step S7, the speed change actuator 79 is driven by a control signal St corresponding to the computed target angle position, whereby the swash plate angle of the pump swash plate 67 in the continuously variable transmission unit T is controlled to a target angle position corresponding to a target gear ratio (represented by Rt). As a result, the gear ratio R is controlled to the target gear ratio Rt.

In computing the target angle position in the case where it is judged that the clutch slip is present, in step S6a (FIG. 6), first, the target gear ratio Rt (when it is judged that the clutch slip is present) is computed. The target gear ratio Rt can be obtained by the following expression (2), showing the value obtained through a process in which an expression $R=(NE/V) \times K1$ obtained by solving the equation $(NE/R) \times K1=V$, derived from the above expression (1) by assuming that the actual engine rotary speed Nr is equal to the target engine rotary speed NE, with respect to the gear ratio R is multiplied by a predetermined constant K2 of less than one $$Rt = (NE/V) \times K1 \times K2 \tag{2}$$

Here, NE is the target engine rotary speed, V is the vehicle speed, K1 is the value obtained based on the circumferential length of the rear wheel Wr by taking the gear ratio into account, and K2 is a constant of less than one for obtaining the target gear ratio Rt and is set at, for example, 0.06.

Next, in step S6b, the speed change actuator 79 is driven by a control signal St corresponding to the target angle position obtained through a process, "TARGET (ANGLE) POSITION←TARGET GEAR RATIO Rt×CONSTANT K3 (the constant K3 in this case is a preliminarily obtained constant for turning the motor swash plate 74 according to a change in the position in the axial direction of the speed change actuator 85 so as to obtain a swash plate angle position of the motor swash plate 74 for getting the target gear ratio Rt)", whereby the swash plate angle of the pump swash plate 67 can be controlled to a target angle position corresponding to the target gear ratio Rt. Incidentally, this control for attaining the target angle position is carried out by a feedback control, as shown in step S7.

In practice, the feedback control by use of the target engine rotary speed NE in step S5 is carried out in a running condition in which the starting clutch 97 is engaged (connected). The target angle position control for the pump swash plate 67 in steps S6 and S7 is conducted as follows.

Figure 7:
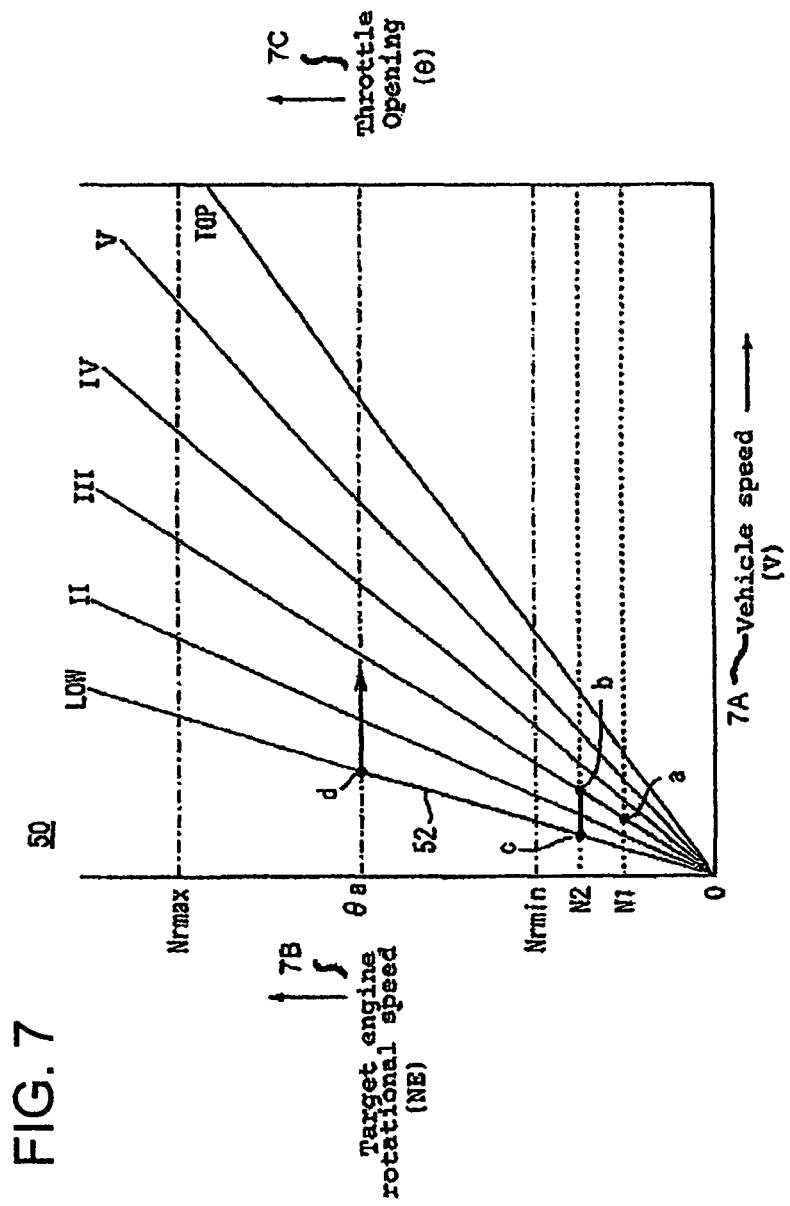
FIG. 7 illustrates the gear ratio control at the time of vehicle starting.

For example, in the case where the throttle grip is operated at the time of vehicle starting in an attempt to start the vehicle with a comparatively large throttle opening θa as shown in FIG. 7 (in this case, the vehicle speed V is zero, since the vehicle is in a stopped condition), the target gear ratio Rt is set at a position between the gear ratio LOW position and HIGH position as indicated by point 'a' on the gear ratio III in FIG. 7 (the vehicle speed V is taken as zero, since the starting clutch 97 is in the disengaged state as above-mentioned) when the actual engine rotary speed Nr reaches or exceeds the clutch-OFF rotary speed N1 and the centrifugal mechanism 89 causes the clutch valve 88 to close the hydraulic closed circuit 85.

Such a setting ensures that, for attaining a target engine rotary speed Nea according to the throttle opening θa, the gear ratio can be set to the gear ratio III in the partially engaged condition. Therefore, a rise in the actual engine rotary speed Nr with the gear ratio position kept along (sticking to) the LOW position as in the prior art can be obviated, and the actual engine rotary speed Nr is increased along the gear ratio III to point 'b', so that at the clutch-ON rotary speed N2 for engagement of the starting clutch 97, the starting clutch 97 is engaged at the gear ratio III.

Consequently, the input gear 69 (input tubular shaft 63) on the engine E side and the output shaft 81 can be connected to each other under a predetermined driving force according to the gear ratio III, whereby the shock at the time of connection can be reduced. Thereafter, the actual engine rotary speed Nr increases according to an actual increase in the vehicle speed V from point c to point d along the LOW position, so that a good vehicle starting feeling is obtained (refer to a variation characteristic 52 indicated by point a→point b→point c→point d→in FIG. 7).

As has been described above, according to the above embodiment, the starting clutch 97 automatically engaged and disengaged according to the actual engine rotary speed NE and the continuously variable transmission unit T capable of continuous speed change according to the rotary speed of the input gear (input shaft) 69 are connected in series with each other between the crankshaft 12 of the engine E and the output shaft 81, the target engine rotary speed Nt is computed from the vehicle speed V and the throttle opening θ, and the gear ratio in the continuously variable transmission unit T is controlled based on the target engine rotary speed Nt, wherein at an actual engine rotary speed Nr corresponding to the partially engaged state of the starting clutch 97, the target gear ratio control (the control in steps S6 and S7) of the continuously variable transmission unit T is performed by determining the target gear ratio Rt from the target engine rotary speed Nt, whereas at an actual engine rotary speed Nr corresponding to the engaged state of the starting clutch 97, the gear ratio R is so controlled that the actual engine rotary speed converges with the target engine rotary speed Nt.

According to the present invention, at an actual engine rotary speed Nr corresponding to the partially engaged state of the starting clutch 97, the target gear ratio control of the continuously variable transmission unit T is performed by determining the target gear ratio Rt from the target engine rotary speed Nt, whereas at an actual engine rotary speed Nr corresponding to the fully engaged state of the starting clutch 97, the gear ratio is controlled such that the actual engine rotary speed Nr converges with the target engine rotary speed NE.

Therefore, for example, in the case where the throttle grip 32 is operated at the time of vehicle starting in an attempt to start the vehicle with a comparatively large throttle opening θ and it is intended to obtain a target engine rotary speed Nt according to the throttle opening θ, it is possible, in the partially engaged condition, to determine (set) the gear ratio at a gear ratio II-VI other than the LOW position.

This ensures that a rise in the actual engine rotary speed Nr with the gear ratio position kept along (sticking to) the LOW position as in the prior art can be obviated, and a predetermined driving force according to the target gear ratio Rt can be attained when the starting clutch 97 is engaged, so that the shock at the time of the connection (engagement) can be reduced, and a good vehicle starting feeling is obtained.

Incidentally, the present invention is applicable not only to the above-described hydrostatic continuously variable transmission unit T but also to belt type continuously variable transmissions equipped with an automatic starting clutch. In addition, the continuously variable transmission equipped with an automatic starting clutch in this manner can be mounted not only on motorcycles but also on four-wheel vehicles; in the latter case, the throttle grip is replaced by an accelerator pedal.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope and spirit of the present invention.

What is claimed is:

1. A method of controlling a gear ratio of a continuously variable transmission in a vehicle, said continuously variable transmission operable to change a rotary speed of an output shaft in relation to a rotary speed of an input shaft connected to an engine of the vehicle, said method comprising the steps of:

automatically controlling an operation of a starting clutch according to an engine rotary speed; said starting clutch and said continuously variable transmission being connected in series between a crankshaft of said engine and said output shaft;

computing a target engine rotary speed from sensed data comprising a present vehicle speed and a throttle opening; and controlling a gear ratio in said continuously variable transmission based on said computed target engine rotary speed;

wherein at an engine rotary speed corresponding to a partially engaged state of said starting clutch, a target gear ratio control of said continuously variable transmission is performed by determining a target gear ratio from said target engine rotary speed, wherein said target gear ratio is set to a gear ratio corresponding to a gear ratio position between a LOW position and a HIGH position, and said target gear ratio is determined by multiplying a gear ratio for obtaining said target engine rotary speed by a constant of not more than 1, wherein said constant is obtained based on said vehicle speed and a gear ratio map;

and wherein at an engine rotary speed corresponding to a fully engaged state of said starting clutch, the gear ratio is controlled such that said engine rotary speed converges with said target engine rotary speed.

2. The gear ratio control method for a continuously variable transmission as set forth in claim 1, wherein said continuously variable transmission is a swash-plate-type hydrostatic continuously variable transmission, and wherein said target gear ratio control is performed by moving the swash plate angle to a target angle position.

3. The gear ratio control method for a continuously variable transmission as set forth in claim 1, wherein said continuously variable transmission is a swash-plate-type hydrostatic continuously variable transmission, and wherein said target gear ratio control is performed by moving the swash plate angle to a target angle position.

4. The gear ratio control method for a continuously variable transmission as set forth in claim 1, wherein said continuously variable transmission is a swash-plate-type hydrostatic continuously variable transmission, and wherein said target gear ratio control is performed by moving the swash plate angle to a target angle position.

5. The method of claim 1, further comprising steps of:
computing an estimated vehicle speed based on a sensed rotary engine speed and a currently applicable gear ratio; and
determining whether clutch slippage is present by comparing the estimated vehicle speed with the sensed present vehicle speed;
and wherein said step of controlling a gear ratio in said continuously variable transmission based on said computed target engine rotary speed, compensates for any clutch slippage, if necessary.

6. The method of claim 1, wherein the continuously variable transmission comprises a hydraulic pump, a hydraulic motor and a hydraulic closed circuit for selectively providing fluid communication between the hydraulic pump and the hydraulic motor, the hydraulic closed circuit comprising a high-pressure oil passage, a low-pressure oil passage and a connecting passage extending between the high-pressure and low-pressure oil passages, the connecting passage having part of a clutch valve disposed therein for selectively controlling fluid flow therethrough; and wherein said starting clutch comprises a centrifugal clutch mechanism operatively attached to an input shaft of said transmission and connected to the clutch valve, the centrifugal clutch mechanism configured such that when the engine rotary speed attains a predetermined reference value, the centrifugal clutch mechanism closes the clutch valve to prevent fluid flow through the connecting passage.

7. A method of controlling a gear ratio in a hydrostatic continuously variable transmission for a power unit of a vehicle, said power unit comprising a hydrostatic continuously variable transmission unit, a starting clutch, an engine having an crankshaft, an input shaft operatively connected to said crankshaft and to said hydrostatic continuously variable transmission unit, an output shaft operatively connected with said hydrostatic continuously variable transmission unit and a driving wheel of said vehicle; said starting clutch being operable to automatically engage and disengage according to a rotary speed of said engine; said starting clutch and said continuously variable transmission being connected in series with each other between said input shaft and said output shaft;
said method comprising the steps of:
computing a target engine rotary speed from a vehicle speed and a throttle opening; and
controlling a gear ratio in said continuously variable transmission based on said computed target engine rotary speed, when a rotary speed of the engine corresponds to a half-engaged state of said starting clutch;
wherein at an engine rotary speed corresponding to a partially engaged state of said starting clutch, a target gear ratio control of said continuously variable transmission is performed by determining a target gear ratio from said target engine rotary speed, wherein said target gear ratio is set to a gear ratio corresponding to a gear ratio position between a LOW position and a HIGH position, and said target gear ratio is determined by multiplying a gear ratio for obtaining said target engine rotary speed by a constant of not more than 1, wherein said constant is obtained based on said vehicle speed and a gear ratio map; and
controlling a gear ratio such that the rotary speed of the engine converges with said target engine rotary speed, when a rotary speed of the engine corresponds to a fully-engaged state of said starting clutch.

8. The method of controlling a gear ratio in a hydrostatic continuously variable transmission as set forth in claim 7, wherein said continuously variable transmission is a swash-plate-type hydrostatic continuously variable transmission, and said target gear ratio is obtained by moving the swash plate to a target angle position.

9. The method of controlling a gear ratio in a hydrostatic continuously variable transmission as set forth in claim 7, wherein said continuously variable transmission is a swash-plate-type hydrostatic continuously variable transmission, and said target gear ratio is obtained by moving the swash plate to a target angle position.

10. The method of controlling a gear ratio in a hydrostatic continuously variable transmission as set forth in claim 7, wherein said continuously variable transmission is a swash-plate-type hydrostatic continuously variable transmission, and said target gear ratio is obtained by moving the swash plate to a target angle position.

11. The method of claim 7, further comprising steps of:
computing an estimated vehicle speed based on a sensed rotary engine speed and a currently applicable gear ratio; and
determining whether clutch slippage is present by comparing the estimated vehicle speed with the sensed present vehicle speed;
and wherein said step of controlling a gear ratio in said continuously variable transmission based on said computed target engine rotary speed compensates for any clutch slippage detected in the clutch slippage determining step, if necessary.

12. The method of claim 7, wherein the continuously variable transmission comprises a hydraulic pump, a hydraulic motor and a hydraulic closed circuit for selectively providing fluid communication between the hydraulic pump and the hydraulic motor, the hydraulic closed circuit comprising a high-pressure oil passage, a low-pressure oil passage and a connecting passage extending between the high-pressure and low-pressure oil passages, the connecting passage having a clutch valve disposed therein for selectively controlling fluid flow therethrough; and wherein said starting clutch comprises a centrifugal clutch mechanism operatively attached to an input shaft of said transmission and connected to the clutch valve, the centrifugal clutch mechanism configured such that when the engine rotary speed attains the clutch-ON rotary speed, the centrifugal clutch mechanism closes the clutch valve to prevent fluid flow through the connecting passage.

13. A method of controlling a gear ratio of a continuously variable transmission for a power unit of a vehicle; said power unit comprising a continuously variable transmission unit, a starting clutch, an engine having a crankshaft, an input shaft operatively connected with said crankshaft and with said continuously variable transmission unit; an output shaft operatively connected with said continuously variable transmission unit and with a drive wheel of said vehicle; said starting clutch and said continuously variable transmission being connected in series between said input shaft and said output shaft;

said method comprising the steps of:
  acquiring sensed data corresponding to an actual engine rotary speed, a throttle opening, and a current vehicle speed;
  computing a target engine rotary speed based on acquired values of said throttle opening and said current vehicle speed by referring to a predetermined gear ratio map;
  computing an estimated vehicle speed based on the actual engine rotary speed and a currently applicable gear ratio;
  determining whether the actual engine rotary speed is between a clutch-OFF rotary speed and a clutch-ON rotary speed;
  determining whether clutch slippage is present by comparing the estimated vehicle speed with the sensed present vehicle speed; and
  determining and applying a target gear ratio based on said target engine rotary speed, including compensating for clutch slippage, when it is determined that the actual engine rotary speed is between said clutch-OFF rotary speed and said clutch-ON rotary speed.

14. The method of controlling a gear ratio of a continuously variable transmission according to claim 13, further comprising the step of controlling a gear ratio such that the actual engine speed becomes equal to the target engine rotary speed, when it is determined that the actual engine rotary speed is equal to said clutch-ON rotary speed.

15. The method of controlling a gear ratio of a continuously variable transmission according to claim 13, wherein said continuously variable transmission is a swash-plate-type hydrostatic continuously variable transmission comprising a swash plate, and wherein said target gear ratio is applied by controlling movement of the swash plate at a computed target angle position.

16. The method of controlling a gear ratio of a continuously variable transmission according to claim 15, wherein said continuously variable transmission unit comprises a speed change actuator which moves said swash plate to said computed target angle position.

17. The method of controlling a gear ratio of a continuously variable transmission according to claim 13, wherein said starting clutch is operable to automatically achieve engaged and disengaged states thereof according to the actual engine rotary speed.

18. The method of controlling a gear ratio of a continuously variable transmission according to claim 13, wherein said starting clutch is automatically disengaged at said clutch-OFF engine rotary speed; and wherein said starting clutch is automatically engaged at said clutch-ON engine rotary speed.

19. The method of controlling a gear ratio of a continuously variable transmission according to claim 18, wherein said clutch-OFF engine rotary speed is approximately 1400 revolutions per minute; and wherein said clutch-ON engine rotary speed is approximately 1800 revolutions per minute.

20. The method of controlling a gear ratio of a continuously variable transmission according to claim 13, wherein said continuously variable transmission is a belt type continuously variable transmission.

* * * * *